Oct. 25, 1966  H. W. THATCHER  3,280,854
SHUTTLE FEELER
Filed Dec. 30, 1963
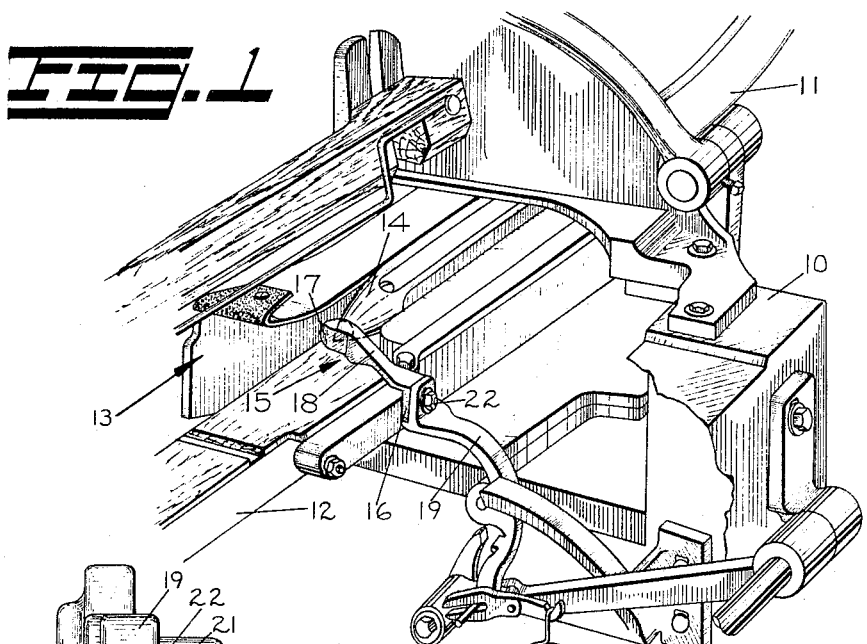
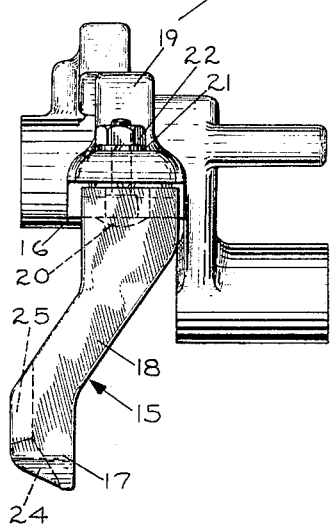
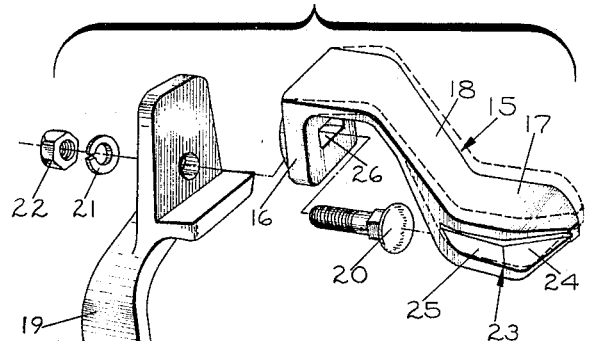
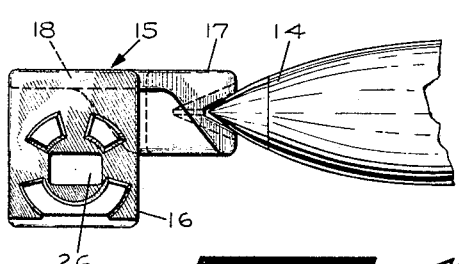
INVENTOR.
HARRY WILLIAM THATCHER
BY *Albert Q. Mahassel*
ATTORNEY 3,280,854
SHUTTLE FEELER
Harry William Thatcher, Mendon, Mass., assignor to Draper Corporation, Hopedale, Mass., a corporation of Maine
Filed Dec. 30, 1963, Ser. No. 334,514
2 Claims. (Cl. 139—253)

This invention pertains to automatic filling replenishing looms of the fly shuttle type and, more particularly, to an improved shuttle feeler for use in such looms.

It is an object of the invention to provide a novel combination shuttle feeler and positioner of plastic such as molded nylon having wear resistant qualities and which will not damage the shuttle spur through contact therewith or become roughened itself to cause cutting of the filling and possible "drag-ins" thereof.

It is a further object of the invention to provide a shuttle feeler having an elongated camming surface generally conforming to the configuration of the tip of a shuttle.

A further object is that of providing a shuttle feeler which is capable of flexing in a vertical arc to compensate for the arc of travel of the lay when said feeler is in contact with the shuttle.

A still further object is that of providing a shuttle feeler which is substantially resistant to lateral movement for camming the shuttle into filling replenishment position and for revoking an indication for replenishment should the shuttle become improperly boxed.

Further objects and advantages of the invention will become apparent from the following more detailed disclosure.

In automatic filling replenishing looms of the fly shuttle type it is essential that the shuttle be accurately positioned in the shuttle box before the transfer of a new filling carrier takes place. Should a shuttle be improperly positioned during the replenishment cycle, improper transfers could result such, for example, as the filling bobbins or carriers being caught and held by only one or two rings in the jaws of the shuttle spring, or they may even be transferred completely through the shuttle.

To prevent conditions of this nature, shuttle feelers are utilized to gauge automatically the position of a shuttle in the shuttle box when an indication is given for filling replenishment.

One type of shuttle feeler, well known in the art and for which the instant invention provides an improved version thereof, comprises an arm pivoted to the loom frame and actuated by the transfer mechanism to move rearwardly over the top of the lay and across the open end of the shuttle box into the pathway the shuttle is caused to follow during the picking thereof. When a shuttle is properly boxed, the shuttle feeler arm will not be interfered with as it moves into the pathway of the shuttle and should the shuttle rebound slightly the tip of the shuttle feeler is effective in camming the shuttle back into the shuttle box and proper filling transfer position. In the event of excessive rebounding of the shuttle which places it substantially out of the proper transfer position, the shuttle feeler will contact the shuttle pivoting said feeler thereby causing the linkage connected thereto to be activated in a known manner to revoke the indication for filling replenishment.

This type of shuttle feeler is of the cast iron type and repeated contact with the tip of a shuttle disfigures the shuttle feeler by wearing and gouging a groove therein. This wearing and gouging become further pronounced due to the differences in the arc of travel the shuttle feeler is caused to move with respect to that of the lay on which the shuttle is carried.

The disfiguring of the shuttle feeler in this manner roughens the tip portion thereof to the extent where the filling becomes cut thereby and is then likely to be carried into the fabric, creating an undesired condition known and described as "drag-ins." Additionally, the shuttle spur or tip becomes damaged and roughened to the extent of being detrimental to the warp threads.

The shuttle feeler according to the instant invention is made from a wear resistant plastic such as nylon and has eliminated the problems that were had with shuttle feelers of the prior art.

Applicant's shuttle feeler includes a laterally adjustable base portion, a feeler tip portion, and an integrally formed intermediate supporting arm extending angularly from the base portion to support said feeler tip portion on the opposite end thereof. The feeler tip is provided with an elongated camming surface generally conforming to the configuration of the tip and end portion of a shuttle. The intermediate supporting arm is flexible in a vertical arc to compensate for the difference in the arc of movement of the lay and is substantially resistant to lateral movement to assure positive camming of the shuttle into replenishment position as well as for revoking an indication for replenishment should a shuttle become improperly boxed.

The invention will be described hereinafter by reference to one embodiment thereof as illustrated in the accompanying figures of drawing, wherein:

FIG. 1 is a perspective view of a portion of the filling replenishing end of a loom with the improved shuttle feeler according to the invention mounted thereon;

FIG. 2 is a perspective view of the shuttle feeler disassembled from its actuating member but in proper relative position for assembly to said member;

FIG. 3 is a plan view of the parts shown in FIG. 2 but in an assembled condition; and FIG. 4 is a view in front elevation of the shuttle feeler and a portion of the shuttle showing the camming surface of the feeler tip and its relation to the tip of the shuttle.

As the general construction and operation of this type of loom is well known and familiar to those skilled in the art, and as the invention is entirely concerned with the shuttle feeler mechanism, it is only considered necessary here to illustrate and describe those parts of a loom directly concerned with a preferred form of the present invention.

FIG. 1, being a perspective view of a portion of the filling replenishing end of a loom and having the shuttle feeler according to the instant invention applied thereto, includes among other parts a portion of the breast beam 10 on which a partially shown battery or magazine 11 is mounted for reserve filling bobbins or carriers. The lay beam is depicted by numeral 12 and is provided with shuttle boxes on each end thereof, one of which is generally indicated by numeral 13 on the replenishment side of the loom.

A shuttle 14 is caused to travel back and forth across the lay 12 in a known manner and to enter the shuttle box 13 on alternate picks and for the purpose of replenishing the filling supply carried thereby when an indication is automatically given for the same.

To effect a proper transfer of a new filling carrier, the shuttle must be properly positioned in the shuttle box; in other words, the shuttle must be positioned directly beneath the battery or magazine 11 in order to position properly a new carrier in said shuttle and to eject simultaneously the spent carrier therefrom.

A shuttle feeler generally indicated by numeral 15 having a base portion 16, a feeler tip portion 17, and an intermediate supporting arm 18 interconnecting said base portion with said tip portion is adapted to assemble to the upper portion of a control arm 19 by means of a bolt 20, lock washer 21, and a hex nut 22.

The novelty of the shuttle feeler 15 constitutes the instant invention and since the mechanism utilized to actuate said shuttle feeler, which includes the control arm 19, is old and well known in the art, it is only considered necessary at this point to call attention to a patent which illustrates and fully describes this mechanism. Accordingly, attention is hereby directed to the information disclosed in U.S. Patent No. 2,317,744.

The shuttle feeler 15 is made from a wear resistant plastic material such as nylon and is provided on the side of the feeler tip portion 17 with an elongated camming surface generally indicated by numeral 23 (FIG. 2). This camming surface defines a V groove conforming generally to the configuration of the tip portion of the shuttle 14 and includes a first part 24 the apex of which extends in a plane oblique to the lay and a second part 25 in continuation of said first part and whose apex extends in a plane perpendicular to said lay. The base portion 16 of the feeler includes a centrally disposed slot 26 which extends in a horizontal direction and parallel with the lower edge of said base portion. This slot provides the necessary aperture for the assembly of the feeler to the control arm 19 by means of bolt 20 and being elongated serves as a means for lateral adjustment of said feeler. By simply loosening the hex nut 22, the shuttle feeler can be moved toward or away from the shuttle within the limits permitted by the slot 26 thereby providing a simplified means for adjusting or replacing this part.

The intermediate supporting arm 18 is flexible in a vertical arc as illustrated by the dotted line position in FIG. 2 which it is caused to assume when performing its intended function. The arc of movement the lay is caused to travel is much greater than that traveled by the shuttle feeler when the latter moves across the path of travel of the shuttle, and the intermediate arm 18 being flexible in a vertical arc compensates for these differences when the camming surface 23 comes into contact with the tip portion of the shuttle 14 being carried by said lay.

In operation, the shuttle is picked back and forth across the lay in a well known manner and on indication for filling replenishment the shuttle enters shuttle box 13 to receive a new filling carrier and to eject the exhausted carrier. On indication for replenishment the lay is moving toward front center and the shuttle feeler is pivoted rearwardly above the lay and into the path the shuttle followed to enter the shuttle box 13. If the shuttle is properly boxed the movement of the shuttle feeler will not be interfered with, but if the shuttle has rebounded from or is late entering the shuttle box to the extent of obstructing the travel of the shuttle feeler, the latter in a known manner will act upon the linkage connected thereto to revoke the indication for replenishment. If the shuttle rebounds from or is late entering the shuttle box to the extent to where only the tip thereof will contact the shuttle feeler, which is substantially resistant to lateral flexing, the shuttle is cammed into the box and the correct transfer position. With a rebound or a late shuttle of this nature, the first part 24 of the camming surface 23 will contact the side of the shuttle's tip portion and continued movement of both the feeler and lay will cause the shuttle to be cammed into the shuttle box. The extended portion or second part 25 of the camming surface 23 and the ability of the feeler to flex in a vertical arc permits the feeler tip portion to travel its full distance and remain aligned with the tip of the shuttle 14. This camming surface 23 together with the feeler tip portion 17 being capable of remaining aligned with the tip of the shuttle when in contact therewith has eliminated the roughing and gouging condition which existed with shuttle feelers of the prior art.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. A shuttle feeler for a loom having a lay, a shuttle box and a shuttle adapted to receive a replaceable filling carrier therein and movable along said lay into and out of said shuttle box, said shuttle feeler including a laterally adjustable mounting base portion, a feeler tip portion and a relatively thin and vertically flexible supporting arm integrally formed with and disposed intermediate said base and tip portions, said feeler tip portion including an elongated, horizontally extending camming surface generally conforming to the configuration of the tip of said shuttle.

2. The shuttle feeler as set forth in claim 1 wherein said elongated camming surface defines a V groove having a first camming surface extending in a plane oblique to said lay and a second camming surface in continuation thereof extending forwardly toward the front of said loom.

References Cited by the Examiner

UNITED STATES PATENTS

| 827,937 | 8/1906 | O'Donnell | 139—253 |
| 932,134 | 8/1909 | Jenckes et al. | 139—253 X |
| 1,375,732 | 4/1921 | Ryon | 139—253 |
| 1,488,137 | 3/1924 | Stafford | 139—231 |
| 1,579,194 | 3/1926 | Davis | 139—231 |
| 2,317,744 | 4/1943 | Draper et al. | 139—231 |
| 2,424,019 | 7/1947 | Brown | 139—231 |
| 2,508,807 | 5/1950 | Todd | 139—253 |
| 3,126,921 | 3/1964 | Simmons | 139—155 |

FOREIGN PATENTS

| 912,843 | 12/1962 | Great Britain. |

MERVIN STEIN, *Primary Examiner.*

DONALD W. PARKER, *Examiner.*

J. KEE CHI, *Assistant Examiner.*